United States Patent
Oliver et al.

(10) Patent No.: US 6,637,557 B2
(45) Date of Patent: Oct. 28, 2003

(54) MAGNETORHEOLOGICAL STRUT PISTON WITH COMPRESSION BYPASS

(75) Inventors: Michael L. Oliver, Xenia, OH (US); William C. Kruckemeyer, Beavercreek, OH (US); Todd A. Bishop, Centerville, OH (US); Eric L. Jensen, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/929,692

(22) Filed: Aug. 13, 2001

(65) Prior Publication Data

US 2003/0029683 A1 Feb. 13, 2003

(51) Int. Cl.⁷ .............................. F16F 9/53; F16F 15/03
(52) U.S. Cl. ..................................... 188/267.2; 188/267
(58) Field of Search ....................... 188/140.14, 140.15, 188/267.2, 268, 281, 282.1, 282.5, 267; 137/909; 251/129.01, 48

(56) References Cited

U.S. PATENT DOCUMENTS 6,095,486 A * 8/2000 Ivers et al. ............... 137/909
6,419,058 B1 * 7/2002 Oliver et al. ............. 188/267.1

* cited by examiner

*Primary Examiner*—Jack Lavinder
*Assistant Examiner*—Robert A. Siconolfi
(74) *Attorney, Agent, or Firm*—Scott A. McBain

(57) ABSTRACT

An adjustable vehicle suspension strut configured to be arranged between a wheel assembly and a body of a vehicle, the adjustable strut including a tube. A piston is slidably carried in the tube on a piston rod. A coil is carried on the piston adjacent a first flow passageway in the piston to produce a magnetic field thereacross and a control valve is carried on the piston controlling fluid flow through a second flow passageway in the piston. The control valve is positioned at the distal end of the rod upstream of the first flow passageway.

23 Claims, 4 Drawing Sheets

MAGNETORHEOLOGICAL STRUT PISTON WITH COMPRESSION BYPASS

TECHNICAL FIELD

In general, the invention relates to damper assemblies for use in vehicle suspension systems, and more particularly, to a damper piston including a bypass valve assembly for a damper or magnetorheological shock absorber or monotube strut.

BACKGROUND OF THE INVENTION

Current vehicle suspensions frequently incorporate dampers, i.e., shock absorber and strut assemblies as both a damping device and, in some applications, part of the suspension's load bearing structure. Dampers are conventionally known which include a piston with a connected piston rod. The piston is slidably contained in a fluid filled tube or chamber.

Such vehicle suspension dampers, used to control vehicle ride and handling, typically contain control valves tuned to control vehicle jounce (compression of damper) and rebound damping (extension of damper) independently. It is generally known that it is desirable to have jounce damping set at approximately one-half to one-third the level of rebound damping. To an extent, in a current design damper provided with magnetorheological features, damping can be externally controlled. Generally, this is accomplished by providing the damper with a magnetorheological fluid, which when exposed to a magnetic field, provides a condition of increased resistance to flow or apparent viscosity in the damper, and thus an increased damping effect. However, the range of damping available from the damper is the same for jounce and rebound.

A type of damper, commonly known as a "McPherson Strut", is commonly used to damp motion of the suspensions of motor vehicles. These struts function with a side load applied between the exposed end of the piston rod and the body of the strut. Within the strut, this side load results in loading at two locations where relative motion occurs. One location is a bearing on the rod guide through which the piston rod slides. The other location is a bearing formed on the exterior of the piston where it slides against the cylinder tube. To minimize loading at these locations, it is desirable to maximize the distance between the rod guide bearing and the piston bearing. Conventional struts are designed so the piston strokes as close to the base of the strut as in practical, maintaining any allowable dead length (length not usable as travel) as part of the distance between the rod guide bearing and the piston bearing.

It would be desirable to provide jounce and rebound control in a strut that provides improved loading control that overcomes the above and other disadvantages.

SUMMARY OF THE INVENTION

One aspect of the present invention provides an adjustable vehicle suspension strut assembly configured to be arranged between a wheel assembly and a body of a vehicle. Accordingly, the present invention provides an adjustable strut including a tube including a magnetorheological fluid, a piston rod positioned in the tube and a piston assembly attached to an internal end of the rod. The piston assembly includes a magnetorheological passageway and a valve assembly. The valve assembly is positioned at a point upstream of the internal end of the piston rod. The valve assembly provides a second passageway for allowing flow of magnetorheological fluid therethrough during a compression stroke of the strut.

Other aspects of the present invention provides a piston assembly including a core positioned on the piston rod and a flux ring positioned about the core that defines the magnetorheological passageway therebetween. The core may include a coil attached thereto, with the coil being positioned adjacent the magnetorheological passageway for producing a magnetic field thereacross. The magnetic field produced across the magnetorheological passageway may change the apparent viscosity of at least a portion of magnetorheological fluid present therein. The valve assembly can include an annular valve seat, an outer surface of the valve seat slidably contacting an inner surface of the tube.

The valve assembly is positioned upstream of the magnetorheological passageway. The second passageway may be formed in the valve seat. The flux ring may be spaced apart from the tube to define a third passageway, the third passageway being in fluid communication with the second passageway to allow fluid flow therethrough. The flux ring and valve assembly may be attached by a cap member.

The cap member may include a first end for threadable connection to the flux ring and a second end for threadable connection to the valve assembly. The valve assembly is permitted to open during compression strokes of the damper and is substantially closed during extension strokes of the damper. The valve assembly may include a first disc that permits a first amount of flow through the control valve during both compression strokes and extension strokes of the damper. The first disc can be a washer including a plurality of outer notches. The first disc may permit a second amount of flow through the control valve during compression strokes, the first amount of flow being less than the second amount of flow. The first disc may be biased against a valve seat portion of the control valve by a spring member. The spring may be one of a wavy washer and a Belleville washer. The second disc may be positioned between the first disc and the spring member.

Another aspect of the present invention provides a method of controlling an adjustable damper including enclosing a piston in a magnetorheological fluid, providing a first passageway in the piston, generating a magnetic field in the first passageway of the piston to produce an apparent viscosity change in the magnetorheological fluid responsive to the magnetic field, providing a second passageway in the piston at a portion of the piston upstream of the first passageway and controlling the fluid flow through a second passageway of the piston. Controlling the fluid flow through the second passageway may include providing a first flow-through the second passageway during an extension stroke and providing a second flow-through during a compression stroke, the first flow being substantially less than the second flow.

Another aspect of the present invention provides an adjustable damper including means for enclosing a piston in a magnetorheological fluid, means for providing a first passageway in the piston, means for generating a magnetic field in the first passageway of the piston to produce an apparent viscosity change in the magnetorheological fluid responsive to the magnetic field, means for providing a second passageway in the piston at a portion of the piston upstream of the first passageway and means for controlling the fluid flow through a second passageway of the piston.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 5:
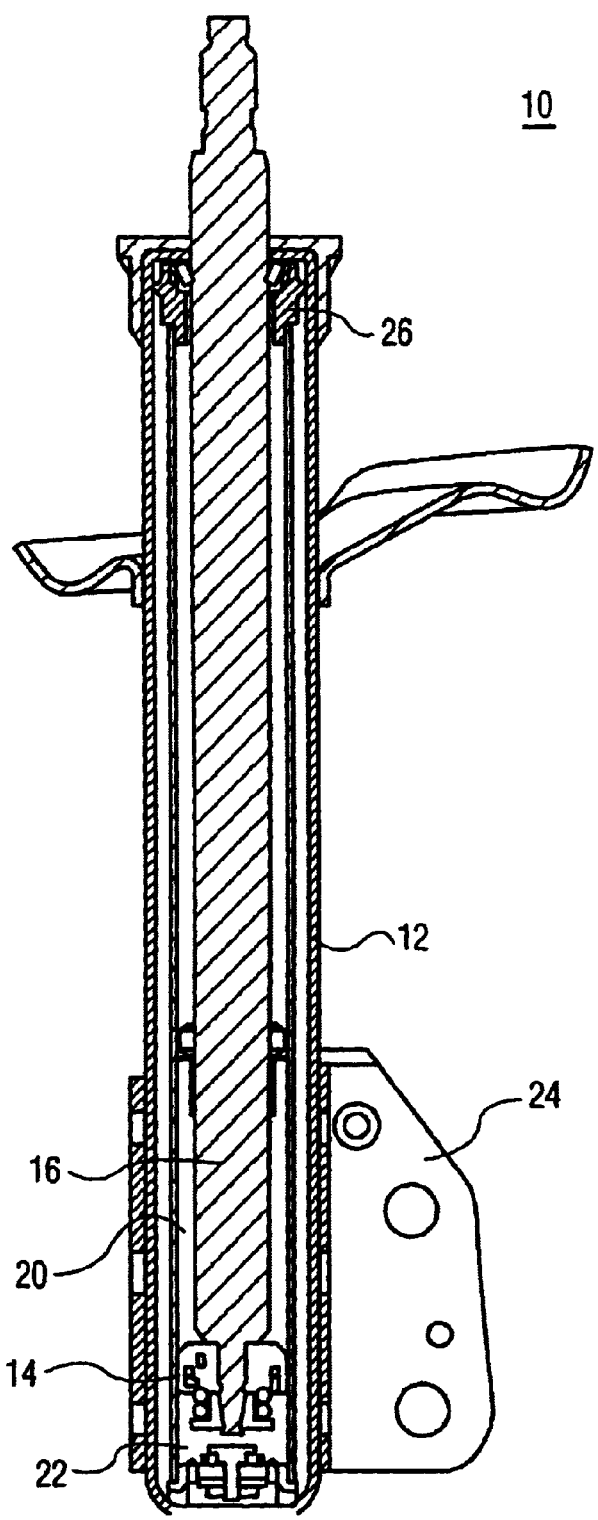
FIG. 5 is a cross-sectional view of a prior art vehicle damper.

Referring to FIG. 5, a prior art vehicle damper assembly suitable for use with the piston assembly of the present invention shown to illustrate the general elements and operation of a strut is shown generally at 10. Strut 10 may include a body 12, a piston assembly 14, a rod 16, a first fluid chamber 20 and a second fluid chamber 22.

The body 12 may be a generally cylindrical shape with a first closed-end including a vehicle attachment 24. A second closed-end of the body 12 can include guide and seal 26 through which an end of the rod 16 can project. Piston assembly 14 can be attached adjacent to the internally positioned distal end of the rod 16 opposite seal end 26. Piston assembly 14 is positioned inside the body 12 and reciprocates therein, dividing the interior of the body into first fluid chamber 20 and second fluid chamber 22. Piston assembly 14 can include orifices or valves (not shown) to impart various controllable damping characteristics to the damper.

When the strut 10 is stroked, damping fluid is forced through orifices and/or valves in the piston assembly 14, providing flow damping and therefore motion damping. The present invention illustrated in FIGS. 1–4, and described herein essentially provides an improved piston assembly to a vehicle damper or strut.

Referring to FIGS. 1–4, a piston assembly of the present invention for use in a damper or strut is illustrated and indicated generally at 40. Related to fluid damping, the piston assembly 40 includes two main functional areas, the magnetorheological (MR) control area 41 and the control valve or bypass area 43.

The MR control area 41 can generally include a core 50 and coil 52, and a flux ring 56 mounted upon rod 62. The core 50 may be a cylindrical bobbin-shaped member disposed about rod 62. The core 50 may be held in position about the rod 62 between a retaining ring 82, which can snap into a peripheral groove in the rod 62 and a shoulder 83 formed on the rod 62. The magnetic core 50 and flux ring 56 may be made of mild steel or other suitable magnetic material.

The core 50 includes a coil 52. A suitable electrical conductor or connections 58 may be positioned in piston rod 62 to provide an electrical signal or current to coil 52. The conductor 58 provides the coil 52 with a connection to one or more external control devices, such as, for example, a system including a computer and sensors on the vehicle or strut (not shown). The conductor 58 may be provided with an insulator 60. Signals from the conductor 58 may be transmitted from the conductor 58 to the coil 52 via any suitable arrangement. In the depicted embodiment, the conductor 58 is attached to a terminal 64. The terminal 64 includes a transverse opening, through which a screw 61 may be threaded. The screw 61, which may include an insulating sleeve or spacer 63 positioned about the shaft of the screw, delivers the signal via a lead or the like to the coil 52. The coil 52 may be held in position about or to the core 50 by a plastic overmolding or covering 54 as is known. The covering may be a polymeric material such as, for example, epoxy or a nylon thermoplastic or thermoset material.

The MR control portion 41 includes a shell portion or flux ring 56 positioned about the core 50 of the piston assembly 40. The flux ring 56 and core 50 defines an annular flow gap or passage 49 therebetween. The flux ring 56 is a cylindrical housing that may be attached at one end to the piston assembly 40 by a plate member 51. The plate member 51 includes a plate passage 53 in communication with the flow gap or passage 49. The flux ring 56 may be attached to the piston assembly 40 at the other end by a threaded portion 84.

When the coil 52 is energized, a magnetic field M extends across flow gap 49 about locations 85, 86, bridging the gap between the core 50 and flux ring 56. MR fluid, a mixture typically of oil and small iron particles, resists flow in the presence of the field M. Controlling the electric current in the coil 52, and thereby controlling the magnetic field M at locations 85, 86, the damping effect of the piston 40 can be varied.

Arrows A and B represent flow of fluid through the gap area 49. The direction represented by arrows A and B is the flow that occurs in a compression or jounce event. During an extension or rebound event, the flow follows the same path but in the reverse direction. Aside from physical size restrictions and magnetic restrictions (when present), this path is always open to fluid flow.

A control valve assembly 65 can include seat 66. The seat 66 is an annular member positioned about the distal (internal) end of rod 62 on the piston assembly at a point past the end of the rod. In other words, the seat 66 of the valve assembly is positioned on the piston assembly in an upstream position, that is, relative to the MR assembly (upstream during a compressive event) and the end of the rod. The seat is provided with an outer surface that slidably contacts the inside of the cylinder 67. The seat 66 includes passages in communication with a passage 71 formed between the cylinder 67 and the flux ring 56. The seat 66 may be connected to the flux ring 56 by way of an assembly cap 69. The assembly cap 69 may threadably engage the seat 66 and the inner threaded portion 84 of the flux ring 56.

An orifice disc or plate 68, a valve disc or plate 70 and a wavy washer or spring 72 can be installed against the valve seat 66. It will be understood that discs 68 and 70 may be a single combined disc or washer or a plurality of discs or washers. Orifice disc 68 may include a plurality of outer notches 73 or the like (see FIG. 2) for permitting passage of fluid therethrough regardless of whether the disc 68 is seated against the seat 66. Spring 72 can be a wavy washer, Belleville spring or other suitable spring device or mechanism that provides a bias against plate 70. The spring 72 can be positioned between the valve plate/orifice plate (which are positioned on the valve seat) and a shoulder of the assembly cap 69. The assembly cap 69, spring 72, valve disc 70, orifice disc 68, and valve seat 66 may be made of magnetically inert material, such as stainless steel.

In operation, when the unit is stroked, magnetorheological fluid flows through, and is subject to control in, the two areas 41, 43 of the piston. The arrow directions at A–B, C–D indicate flow of fluid during a compression stroke (shortening) and would be reversed for a rebound stroke.

The flow indicated by arrows A and B, through first flow passageway 49 can be controlled by the magnetic field M generated when coil 52 is energized. Electrical current in the coil 52 may generate a magnetic field shown as M in the core 50 and the flux ring 56 and across the flow path 49 as shown. Magnetorheological fluid, typically a mixture including oil and small particles of iron, becomes resistant to flow, or exhibits an increased apparent viscosity when a magnetic field is applied thereto. By varying the current in the coil 52, the magnetic field shown by M can be varied and damping force generated within this flow path 49 is varied accordingly. The damping effect in the flow path 49 (indicated by arrows A and B) is essentially the same for compression and rebound stroke or damping events when the current through the coil 52 is maintained at the same value.

Figure 1:
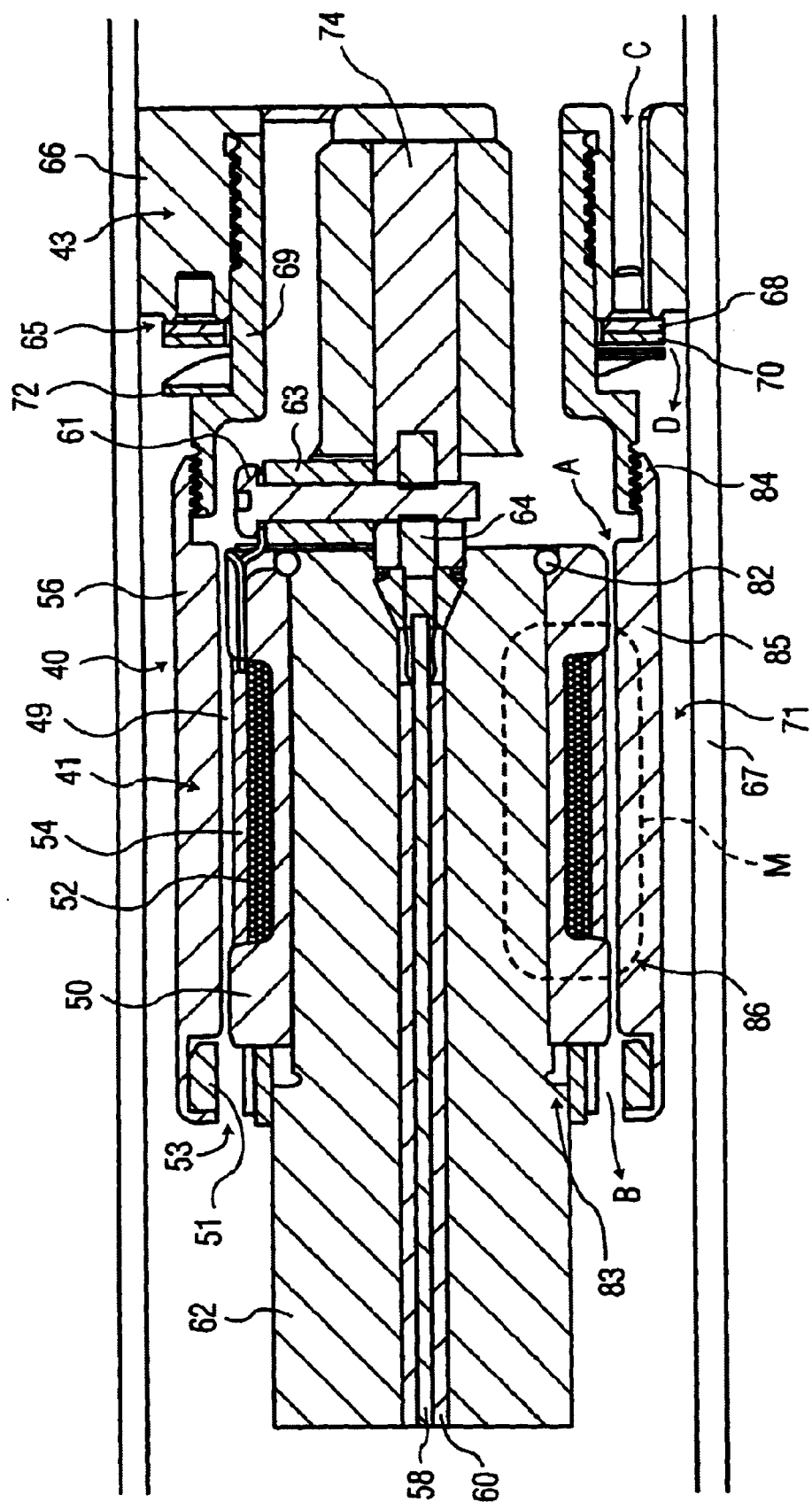
FIG. 1 is a side view of one embodiment of the damper piston assembly of the present invention.
Figure 2:
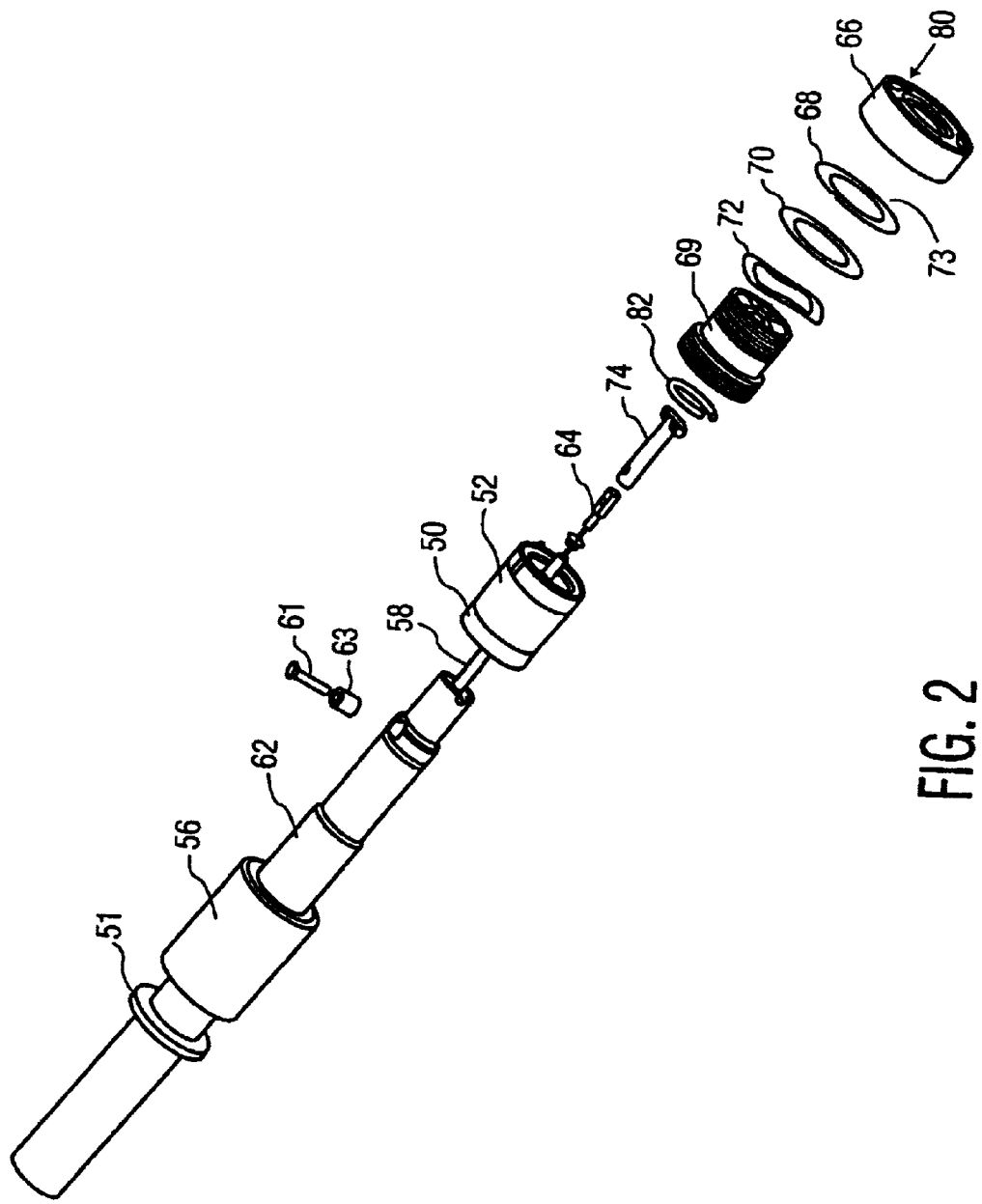
FIG. 2 is an exploded view of the embodiment shown in FIG. 1.

Flow, as indicated by arrows C and D, is allowed under all conditions by the orifice disc 68 (if present). During a rebound stroke, orifice flow only is permitted. During a compression stroke, additional flow is permitted when enough fluid pressure is generated to deflect the spring 72. At this time, flow is controlled by the amount of lift of the valve disc 70, and the orifice disc 68 and the dimensions of openings 80 provided to the valve seat 66. The one or more openings 80 in valve seat 66 are shown in FIG. 2. The fluid pressure working against the spring 72 may control lift off of the valve disc 70 in response to fluid pressure applied to the valve disc. A spacer (not shown) may be installed between the assembly cap 69 and spring 72 as required to adjust the force applied by the spring 72. In other words, the thicker the spacer, the more force is required to unseat disc 68, 70 against the bias of spring 72. It will be understood that no extra control need be applied to this flow.

The performance resulting from the two flow paths together provides compression damping which is a function of the combination of the external control path (A, B) and preset pressure regulated bypass path (C, D). Rebound damping is controlled primarily through the externally controllable path (A, B). This permits compression damping to be controlled within a more desired range, when compared to rebound damping.

Referring to FIG. 2, one embodiment of the piston assembly is shown in an expanded view. The piston assembly may be assembled in the following manner. The core 50 includes a coil 52 wound thereupon before positioning onto the rod 62. The flux ring 56 with the plate 51 secured at one end is inserted over the core 50. The core 50 is seated against the retaining ring 82 and held in place by the assembly cap 69.

The insulating spacer 63 may be installed over the screw 61. One end of the coil 52 is connected to conductor 58 in the center of rod 62, and the other end to the screw 61 through a coil lead, or the like. The screw is threaded through terminal 64, which is crimped onto the conductor 58. The electrical path energizing the coil 52 includes the conductor 58, terminal 64 and screws 61 for one path. The second path is the rod 62 itself. One end of the coil 52 is attached to the core 50. An insulating terminal holder 74 supports and holds the terminal 64 in alignment.

The assembly cap 69 is threaded into the flux ring 56 and seated on the distal end of the rod 62, pulling the flux ring 56 against the core 50 and stopped by the retaining ring 82. In this embodiment, the magnetic flux path M can include the rod 62, if required to avoid magnetic saturation. The flux ring 56, core 50 and rod 62 (the portion of the rod 62 within the core 50) should be constructed of magnetically soft material such as mild steel. The plate 51 and assembly cap 69 should be constructed of magnetically inert material such as aluminum or stainless steel or any suitable non-magnetic material.

The valve seat 66 is threaded onto the assembly cap 69 and retains the spring 72, the valve plate 70 and orifice plate 68 against a step in the assembly cap 69. The assembly cap 69 features ribs 90 (see FIGS. 3 and 4) that fit against the end of the rod 62, so that when the valve seat 66 is pressed against the cylinder tube 67, substantial support for the valve seat is available from the end of the rod 62. It is desirable that the spring 72, the valve plate 70 and the orifice plate 68 and the valve seat 66 be constructed of a magnetically inert material such as stainless steel.

The valve seat 66 is positioned at the distal (internal) end of the piston rod 62 and the outer surface thereof is used as a bearing surface with the strut tube 67. In this manner, the strut is better supported for side loads. Further, the MR control mechanism 41 is located in an area of the strut not utilized for travel. In this manner, dead length is reduced.

Figure 3:
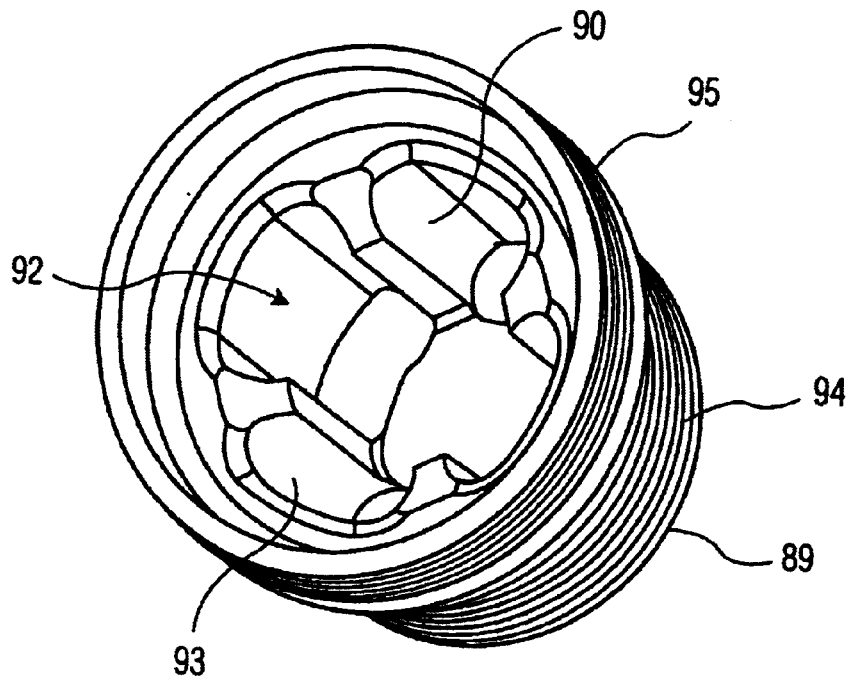
FIG. 3 is a perspective view of the assembly cap portion of the piston assembly of the present invention.
Figure 4:
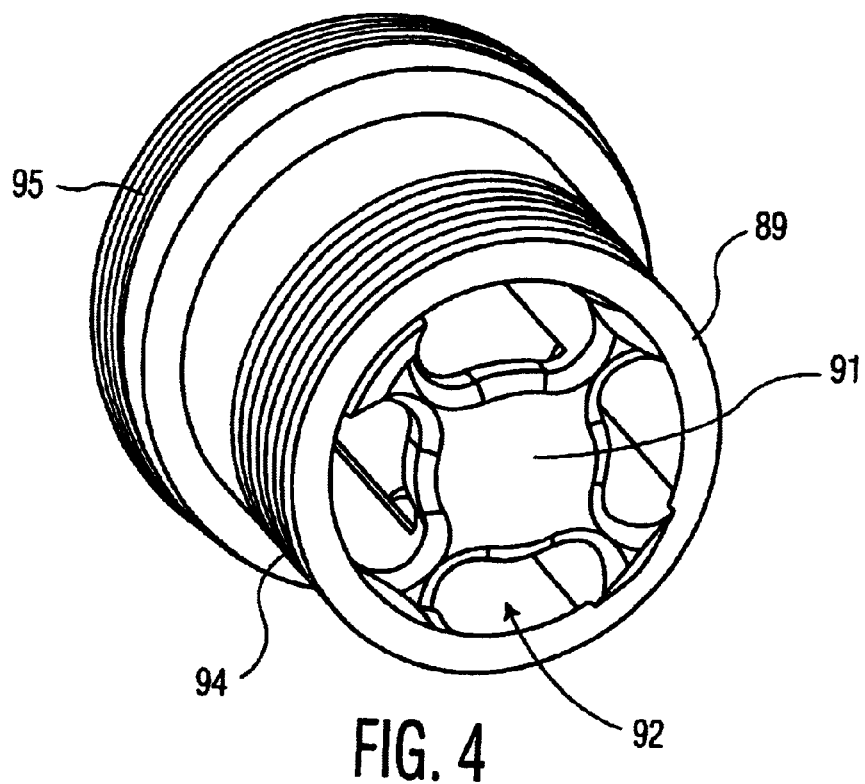
FIG. 4 is a reverse perspective view of the assembly cap of FIG. 3.

Referring to FIGS. 3 and 4, an embodiment of the assembly cap is shown. The assembly cap 69 includes a distal end 89 with a disc 91 for contacting the distal end of the rod 62. The distal end also includes a plurality of openings and/or passages 92 defined by the disc 91 and a plurality of ribs 93 spaced about the interior of the cap 69. Further, the cap 69 may include an outer threaded portion 94 for securing the valve seat 66 thereto. Opposite the distal end 89, the cap 69 may include an outer threaded portion 95 for securing the flux ring 56 thereto.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. An adjustable strut comprising:
   a tube including a magnetorheological fluid;
   a piston rod positioned in the tube; and
   a piston assembly attached to an internal end of the rod, the piston assembly including a magnetorheological passageway and a valve assembly, the valve assembly being positioned at a point upstream of the internal end of the piston rod, wherein the valve assembly provides a second passageway for allowing flow of magnetorheological fluid therethrough during a compression stroke of the strut,
   wherein the piston assembly includes a core positioned on the piston rod and a flux ring positioned about the core and defining the magnetorheological passageway therebetween,
   wherein the flux ring is spaced apart from the tube to define a third passageway, the third passageway being in fluid communication with the second passageway to allow fluid flow therethrough, and
   wherein the flux ring and valve assembly are attached by a cap member.

2. The strut of claim 1 wherein the core includes a coil attached thereto, wherein the coil is positioned adjacent the magnetorheological passageway for producing a magnetic field thereacross.

3. The strut of claim 2 wherein the magnetic field produced across the magnetorheological passageway changes the apparent viscosity of at least a portion of magnetorheological fluid present therein.

4. The strut of claim 2 wherein the valve assembly includes an annular valve seat, an outer surface of the valve seat slidably contacting an inner surface of the tube.

5. The strut of claim 4 wherein the valve assembly is positioned upstream of the magnetorheological passageway.

6. The strut of claim 5 wherein the second passageway is formed in the valve seat.

7. The strut of claim 1 wherein the cap member includes a first end for threadable connection to the flux ring.

8. The strut of claim 7 wherein the cap member includes a second end for threadable connection to the valve assembly.

9. The strut of claim 1 wherein the valve assembly is permitted to open during compression strokes of the damper.

10. The strut of claim 9 wherein the valve assembly is substantially closed during extension strokes of the damper.

11. The strut of claim 1 wherein the valve assembly includes a first disc that permits a first amount of flow through a control valve during both compression strokes and extension strokes of the damper.

12. The strut of claim 11 wherein the first disc is a washer including a plurality of outer notches.

13. The strut of claim 12 wherein the first disc permits a second amount of flow through the control valve during compression strokes, the first amount of flow being less than the second amount of flow.

14. The strut of claim 13 wherein the first disc is biased against a valve seat portion of the control valve by a spring member.

15. The strut of claim 14 wherein the spring member is one of a wavy washer and a Belleville washer.

16. The strut of claim 14 wherein a second disc is positioned between the first disc and the spring member.

17. A method of controlling an adjustable damper comprising:

enclosing a piston in a magnetorheological fluid, the piston including a flux ring and a valve assembly;

providing a cap assembly positioned between the flux ring and the valve assembly;

providing a first passageway in the piston;

generating a magnetic field in the first passageway of the piston to produce an apparent viscosity change in the magnetorheological fluid responsive to the magnetic field;

providing a second passageway in the piston at a portion of the piston upstream of the first passageway;

controlling the fluid flow through a second passageway of the piston; and providing a third passageway in fluid communication with the second passageway to allow fluid flow therethrough.

18. The method of claim 17 wherein controlling the fluid flow through the second passageway includes providing a first flow-through the second passageway during an extension stroke and providing a second flow-through during a compression stroke, the first flow being substantially less than the second flow.

19. An adjustable strut comprising:

means for enclosing a piston in a magnetorheological fluid;

means for providing a first passageway in the piston;

means for generating a magnetic field in the first passageway of the piston to produce an apparent viscosity change in the magnetorheological fluid responsive to the magnetic field;

means for providing a second passageway in the piston at a portion of the piston upstream of the first passageway;

means for controlling the fluid flow through a second passageway of the piston, means for providing a third passageway in fluid communication with the second passageway to allow fluid flow therethrough; and means for attaching the means for providing a second passageway to the means for providing a third passageway.

20. An adjustable strut comprising:

a tube including a magnetorheological fluid;

a piston rod positioned in the tube; and a piston assembly attached to an internal end of the rod, the piston assembly including a magnetorheological passageway and a valve assembly, the valve assembly being positioned at a point upstream of the internal end of the piston rod, wherein the valve assembly provides a second passageway for allowing flow of magnetorheological fluid therethrough during a compression stroke of the strut, wherein the piston assembly includes a core positioned on the piston rod and a flux ring positioned about the core and defining the magnetorheological passageway therebetween, and wherein the flux ring and valve assembly are attached by a cap member.

21. The strut of claim 20 wherein the cap member includes a first end for threadable connection to the flux ring.

22. The strut of claim 21 wherein the cap member includes a second end for threadable connection to the valve assembly.

23. The strut of claim 20 wherein the cap member further comprises a disc portion defining a plurality of openings and a plurality of ribs spaced about an interior portion of the cap member.

* * * * *